United States Patent [19]

Di Perry

[11] Patent Number: 5,574,460
[45] Date of Patent: Nov. 12, 1996

[54] MANUAL PROBE ACQUISITION SYSTEM

[75] Inventor: John Di Perry, Riverside, Calif.

[73] Assignee: The United States of America as represented by the Secretary of the Navy, Washington, D.C.

[21] Appl. No.: 431,490

[22] Filed: Feb. 3, 1965

[51] Int. Cl.[6] ................ G01S 13/72; G01S 7/10
[52] U.S. Cl. .................. 342/62; 342/95; 342/97; 342/176; 342/183
[58] Field of Search ............. 343/7, 7.3; 342/62, 342/90, 95, 96, 97, 176, 183

[56] References Cited

U.S. PATENT DOCUMENTS

| | | | |
|---|---|---|---|
| 3,701,989 | 10/1972 | Calhoon, Sr. et al. | 342/147 |
| 3,729,150 | 4/1961 | Conger | 244/3.13 |
| 3,731,304 | 5/1973 | Caspers et al. | 342/90 |
| 3,781,885 | 12/1973 | Hassencahl | 342/95 |
| 3,832,711 | 8/1974 | Grant et al. | 342/62 X |
| 3,878,530 | 4/1975 | Wilmot | 342/90 |
| 3,879,730 | 4/1975 | Arsem | 342/95 |
| 3,891,988 | 6/1975 | Ryan et al. | 342/155 |
| 3,928,850 | 12/1975 | Pollack et al. | 342/95 |
| 3,943,510 | 3/1976 | Orton | 342/95 |
| 3,949,955 | 4/1976 | Sykes et al. | 244/3.19 |
| 3,986,187 | 10/1976 | Jacob | 342/95 |
| 4,214,239 | 7/1980 | Dilalrd | 342/90 |

*Primary Examiner*—John B. Sotomayor
*Attorney, Agent, or Firm*—David S. Kalmbaugh; Melvin J. Sliwka

[57] ABSTRACT

A probe acquisition and display system is disclosed featuring one simple control for acquiring, tracking, and instantaneously locking for a missile control radar. The system provides for fast initial target acquisition and re-acquisition in the presence of intentional or unintentional interference. A dual trace oscilloscope display is provided with radar tracking (range) gate and a probe is used to touch a target on the display by a radar operator.

3 Claims, 1 Drawing Sheet

5,574,460

1

MANUAL PROBE ACQUISITION SYSTEM

The invention herein described may be manufactured and used by or for the Government of the United States of America for governmental purposes without the payment of any royalties thereon or therefor.

BACKGROUND OF THE INVENTION

The present invention relates to radar systems and more particularly to a system for instantaneously locking a tracking radar on a desired target.

The instant invention relates to copending application Ser. No. 317,850 for Manual Probe Tracking System, filed Oct. 21, 1963, now U.S. Pat. No. 3,217,320, and provides additional target acquisition capability. The copending application operates only within a relatively small range segment of the full operating range of the radar system. This range segment, called the "acquisition gate", is 10,000 yards, whereas the full operating range of the radars are from zero to approximately 120,000–300,000 yards. The additional probe capability, as described herein, provides operation over the full radar operating range in conjunction with the probe operation within the 10,000 yard range segment provided by copending application Ser. No. 317,850. This invention is designed to provide instantaneous positioning of the acquisition gate at any range within the full operating range of the radar upon the operator's command. The invention is designed to operate with a dual trace display on the radar operator's scope. The upper trace is the added display, while the lower trace is that of copending application Ser. No. 317,850.

The old methods used for positioning the 10,000 yard acquisition gate did not provide the required instantaneous action, ease of operation, accuracy and reliability for operator control. Also, the old methods were relatively complicated and awkward to operate. The prior methods did not provide the operator with the full radar range display together with the 10,000 yard display simultaneously with probe control on the same scope as is provided in the instant invention.

SUMMARY OF THE INVENTION

It is an object of the invention to provide an improved system to instantaneously lock a tracking radar on a desired target.

Another object of the invention is to provide fast initial target acquisition and re-acquisition in the presence of intentional or unintentional interference.

A further object of the invention is to provide one simple control for acquiring, tracking, and instantaneous lock for missile control radar.

Other objects and many of the attendant advantages of this invention will become readily appreciated as the same becomes better understood by reference to the following detailed description when considered in connection with the accompanying drawings wherein:

DESCRIPTION OF THE PREFERRED EMBODIMENT(S)

Figure 1:
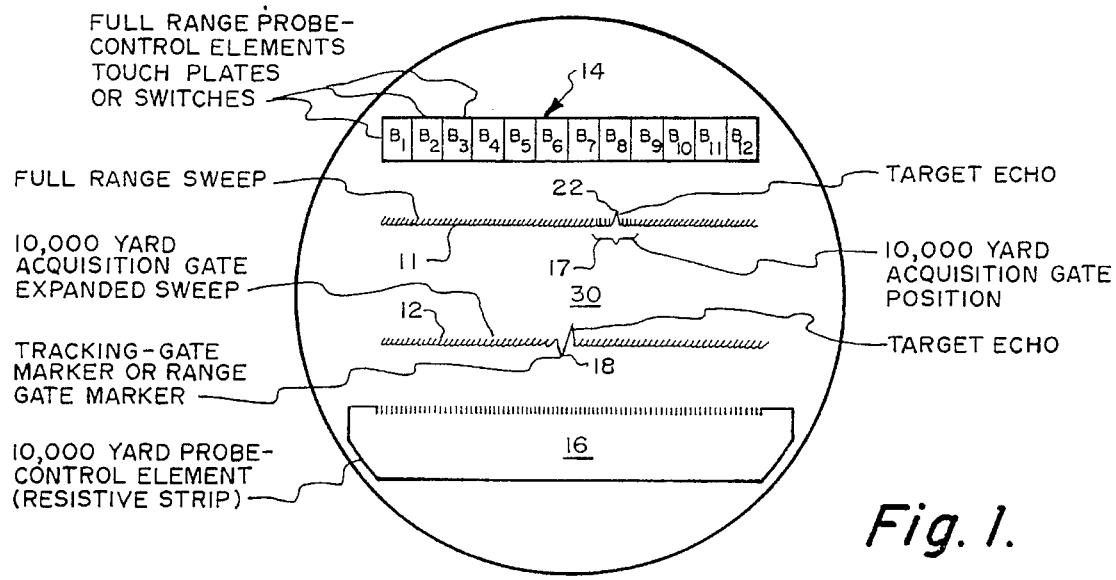
FIG. 1 shows a dual trace oscilloscope display and control including the full sweep of the instant invention.

Referring now to the drawings like reference characters refer to like parts in each of the figures.

FIG. 1 shows the dual trace oscilloscope display 30 and the control elements 14 of the probe acquisition and tracking system. The full range sweep of the instant invention is shown with the 10,000 yard acquisition gate and the target echo pulse on the top trace 11. The 10,000 yard acquisition gate with the radar tracking (range) gate and the target echo pulse is shown in an expanded form on the lower trace 12. The invention's full range probe control switching elements 14 are shown above trace 11. The expanded acquisition gate sweep, lower trace 12, and the range gate positioning element 16, below trace 12, were described in aforementioned copending patent application Ser. No. 317,850 which forms a part of the probe system shown in FIG. 1. The complete probe system is designed to be used by the radar operator to instantaneously position: the acquisition gate at any 10,000 yard pre-set position 17, for example, within the full range sweep trace 11, and the radar's range gate 18, for example, at any point within the acquisition gate. All tracking operations are accomplished with the probe 20, FIG. 2. These operations are accomplished as follows: If a target echo pulse 22, for example, is seen by the operator at any range in upper trace 11, he would first point, with the point of probe 20, to an acquisition gate positioning element 14 ($B_1$, $B_2$, etc.) directly above the target pulse. The acquisition gate will then instantaneously appear (at the instant that the probe point touches the selected touch plate 14) at the target range. The target will automatically be acquired by the range gate 18 (through the range sweeping action of the conventional radar system) immediately after the probe point is removed from the positioning element 14. It is not required to hold the probe on the touch plate 14 to accomplish gate positioning action, only a momentary touch (less than 0.25 second) is required. The target echo pulse 22 and range gate pulse 18 will now appear in the expanded trace 12, as shown. If other pulses, such as interference etc., are also present within the lower trace 12, probe 20 is used to place and maintain the range gate on the desired target by pointing and contacting the probe at a point on resistive element 16 directly below the target echo pulse position.

As mentioned above, the acquisition gate and range gate positioning functions are relatively instantaneous. This operation is accomplished by the utilization of electronic circuitry. However, in order to use this system with the motor driven ranging system of conventional radars a differential circuit is used to match the two systems. This differential circuit is of the type disclosed in Transistor Circuits by McGraw-Hill, 1963, page 133 for a differential amplifier, for example.

Figure 2:
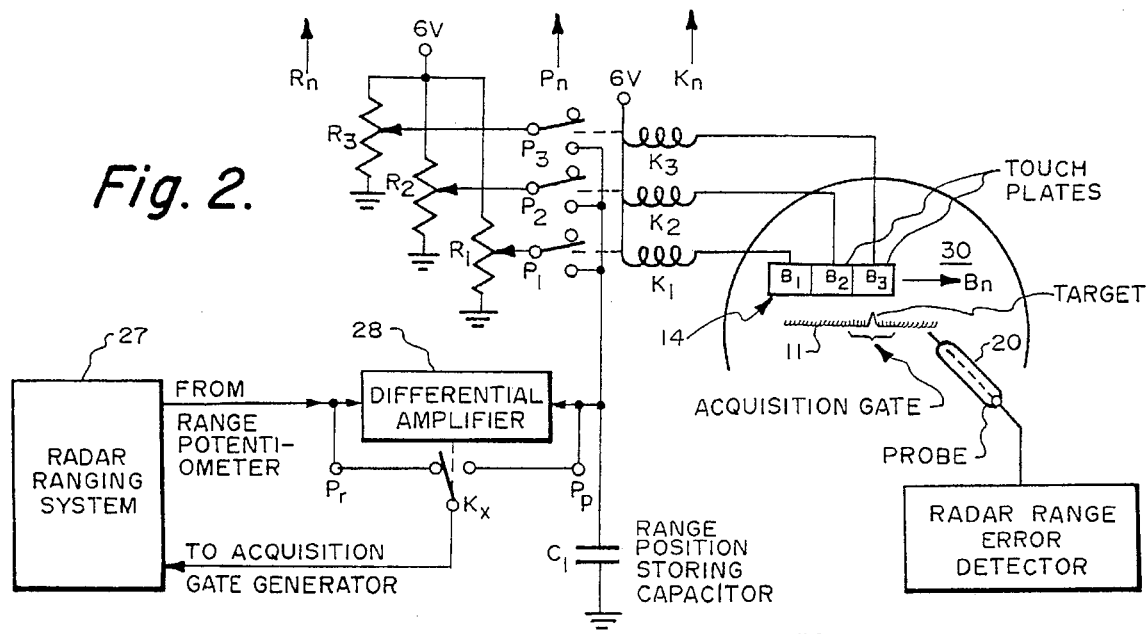
FIG. 2 shows a simplified circuit diagram of the present invention.
Figure 3:
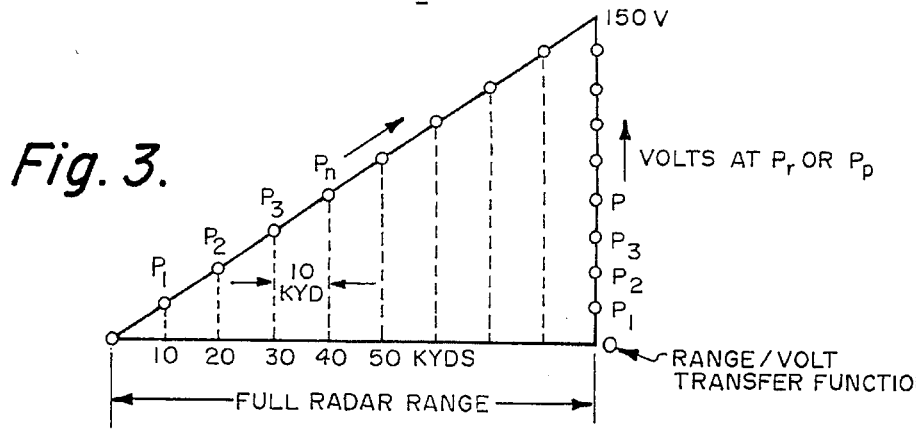
FIG. 3 is a Range/Volt transfer function diagram.

FIG. 2 shows a simplified diagram of the circuitry of the invention. FIG. 3 shows, typically, the normal radar system Range/Volt transfer function diagram for a circuit as in FIG. 2. Relay $K_x$ in FIG. 2 is shown switched for normal radar operation. The voltage at point $P_r$ is the voltage normally fed into the radar 27 system's acquisition gate generator which is used to generate the acquisition gate pulse at a position along the full radar range trace proportional to the voltage at point $P_r$. The transfer function diagram of FIG. 3 shows that as the voltage at $P_r$ changes from zero volts towards 150 volts, the acquisition gate will follow in range from zero range towards maximum range respectively. The voltage at $P_r$ is, for example, obtained from the moving arm of a motor driven potentiometer, not shown, in the Radar Ranging System 27. The motor which drives the potentiometer in the Radar Ranging System is controlled by the radar automatic tracking system and by differential circuit 28. If relay $K_x$ is switched to point $P_p$, the voltage across Range Position Storing capacitor C1 will determine the position in range where the acquisition gate pulse will be generated. This is indicated in the Range/Volt transfer function diagram of FIG. 3 as $P_1$, $P_2$, $P_3$, $P_n$. The voltage $P_1$ may be set to represent acquisition gate generation at 10,000 yards (10 Kyds), $P_2$=20 Kyds, $P_3$=30 Kyds etc. The voltages of $P_1$, $P_2$, $P_3$, $P_n$ are adjusted for exact range positioning of the acquisition gate through the center arm of potentiometers $R_1$, $R_2$, $R_3$, $R_n$. The positioning voltages are applied to range position storing C1 through the contracts of range relays $K_1$, $K_2$, $K_3$, $K_n$. Any of these relays will be energized when the point of probe 20 contacts a touch plate 14. $K_1$, $K_2$, $K_3$, $K_n$ are energized only momentarily, i.e., while the probe point makes contact with a touch plate 14 (normally about 0.25 second). Two touch plates can be touched simultaneously with the probe 20 by pointing the probe tip between the plates 14. In this case the acquisition gate will be generated stradled half way between the plates touched. Capacitor C1 once charged through $K_1$, $K_2$, etc., will hold the positioning voltage selected until $K_x$ is reset to point $P_r$ by differential amplifier circuit 28.

Relay $K_x$ is energized by differential amplifier 28. Differential amplifier 28 will switch $K_x$ whenever the voltage at point $P_p$ is different, even by a small range margin than the voltage at point $P_r$. In other words, if the acquisition gate is presently located at any range other than say the 30 Kyd position, for example, the voltage will be different when the 30 Kyd touch plate $B_3$, for example, is touched by the probe 20, FIG. 2 thus, relay $K_x$ will switch from point $P_r$ to point $P_p$. Relay $K_x$ will remain switched to point $P_p$ until the motor driven voltage at point $P_r$ becomes equal to the voltage at point $P_p$. When the voltage at point $P_r$ becomes equal (range match) to the 30 Kyd voltage at point $P_p$, the logic of differential amplifier 28 resets relay $K_x$ back to normal radar operation. Differential amplifier 28 operating functions are: to switch relay $K_x$ from point $P_r$ to point $P_p$ whenever selection of a new range is desired by the radar operator; to automatically energize the radar ranging motor in the radar ranging system to vary the voltage at point $P_r$ until equal to voltage at point $P_p$; to reset $K_x$ to point $P_r$ (normal operation) when $P_r$=$P_p$. In addition, differential amplifier 28 provides proper sense so that the motor in the radar ranging system 27 will always drive towards the new range position.

The method used to generate the two sweeps on the radar scope display 30 is well known and therefore not described. The only requirement is that a full range display and an expanded range display be used. For example, U.S. Pat. No. 2,850,727 discloses the generation of an expanded range display.

The invention permits target acquisition much faster than the old methods of radar operator aid. Fast initial target acquisition and reacquisition is provided, particularly in the presence of interference, intentional or unintentional. Also, the radar operator has one simple control to acquire, track, and for other functions.

The range segment relays $K_1$, $K_2$, etc., can be replaced by individual switches on the scope face, if desired. This means that elements 14 ($B_1$, $B_2$, $B_3$, etc.,) can be touch plate switches which are switched-on by depressing any one touch plate with the probe 20 and off when the probe tip is lifted away.

The touch plates 14 may also be replaced by a continuous resistance strip, essentially simular to the range gate probe control strip 16 used for the expanded sweep. The voltage across the resistance strip can either be the full range voltage (0 to 150 volts, for example) which can be applied directly to capacitor C1 through probe 20 or can be a low voltage, say 0 to 15 volts, for example, and amplified by a dc amplifier to give the required 0 to 150 volts then fed to capacitor C1.

Obviously many modifications and variations of the present invention are possible in the light of the above teachings. It is therefore to be understood that within the scope of the appended claims the invention may be practiced otherwise than as specifically described.

What is claimed is:

1. In a range tracking radar system a manual-aid for the instantaneous and accurate positioning of tracking radar acquisition gate signals at any position within the full operating range of the radar ranging system upon operator command, comprising in combination:

(a) a dual trace radar oscilloscope display, one trace representing the full operating range of the radar system a select relatively small segment of which represents the acquisition gate, and the other trace representing the acquisition gate in expanded form, (b) first and second control means mounted on the outer face of said oscilloscope, (c) said first control means being adjacent to and corresponding to the length of said full operating range trace, (d) said second control means being adjacent to and corresponding to the trace of said acquisition gate in expanded form, (e) means to effect connection of said first and second control means to the radar ranging system, (f) said first control means being operable upon connection to the radar ranging system to instantaneously position the acquisition gate at any range in said full operating range trace where a target echo pulse appears upon operator command whereupon the target pulse will automatically be acquired by the radar system range gate and will also appear on the expanded acquisition gate trace, (g) said second control means being operable upon connection to the radar ranging system to position and maintain the range gate pulse on the desired target echo pulse upon operator command in the presence of other pulses due to interference and other targets appearing on said expanded acquisition gate trace, 2. A system as in claim 1 wherein said first control means comprises means for providing a voltage distribution along the length of the control means to match the voltage within said radar ranging system for positioning the acquisition gate to a desired target echo pulse position within said full operating range trace on the oscilloscope display, 3. A system as in claim 1 wherein said second control means comprises means providing a voltage distribution along the length of the control means to move and maintain the range gate indicated on the expanded trace to the desired target pulse indicated thereon.

* * * * *